Figure 1:
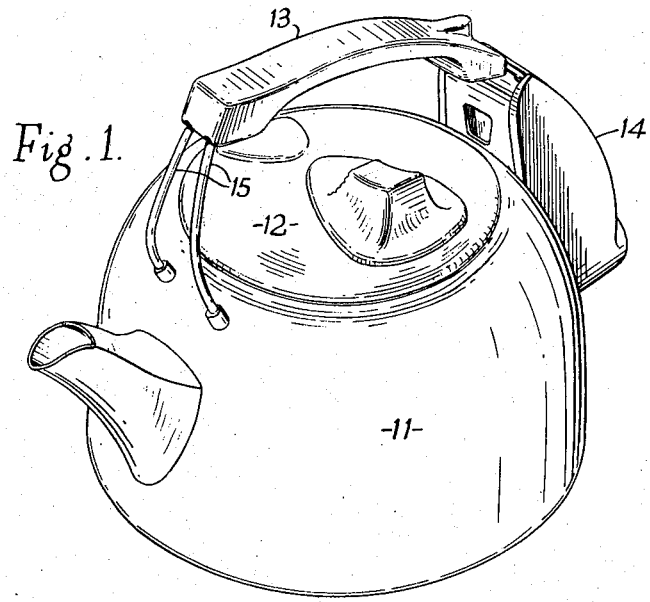

March 20, 1962 — W. M. RUSSELL — 3,026,402
ELECTRIC KETTLES

Filed April 11, 1960 — 4 Sheets-Sheet 1

INVENTOR
William M. Russell
BY
Kenon, Palmer & Stewart
ATTORNEY

United States Patent Office 3,026,402
Patented Mar. 20, 1962

3,026,402
ELECTRIC KETTLES
William Morris Russell, "Egypt Wood," Merstham, Surrey, England
Filed Apr. 11, 1960, Ser. No. 21,224
Claims priority, application Great Britain Apr. 16, 1959
7 Claims. (Cl. 219—44)

This invention relates to electric kettles.

At present it is usual to mount the heating element of an electric kettle on a brass pressing, which pressing carries the temperature sensitive means whereby a switch is caused to interrupt the supply of electricity to the element when the kettle boils dry or is switched on empty. Also mounted on insulation on the brass pressing are terminal pins adapted to receive a connector plug. This assembly of heating element, temperature sensitive means and terminal pins is generally held in position within the kettle by means of a comparatively large screwed ring of sufficient length to shroud the terminal pins. The brass pressing and securing ring are somewhat expensive to manufacture and there is considerable difficulty and therefore expense in designing a temperature sensitive switch which will fit within the limited space available and which is robust and easily adjustable. Moreover, there are no usual means for interrupting the supply when the kettle boils, though it is quite common to provide means for doing so when it boils dry.

Accordingly, one of the main objects of this invention is to provide an electric kettle with an improved single switch unit which combines the functions of interrupting the supply of electric current to the heating element when the kettle boils and of interrupting the said supply when the kettle is switched on empty.

A further object is to provide an electric kettle with two separate and easily replaceable units, constituted respectively by a switch unit combining the above-mentioned functions and by the heating element of the kettle.

A still further object is to provide an electric kettle with a switch unit which combines the above-mentioned functions and embodies adjusting means whereby the switch unit can be set to operate at the correct instant after the kettle boils or when the kettle is switched on empty and which is readily removable and replaceable without disturbing the settings of the said adjusting means.

Other objects are to enable such an electric kettle switch unit to be cheaply and easily manufactured and to provide the same with clearly visible means for indicating whether the contacts of the switch unit are closed or open.

With the main object in view, there is provided according to this invention an electric kettle which comprises a container for the liquid to be boiled, an electric heating element arranged in the container for heating the liquid, a housing mounted externally on and thermally insulated from the container, a circuit-breaker arranged within the housing and connected in the electric supply circuit of the heating element, two heat-responsive elements mounted in the housing and adapted, on being heated to corresponding predetermined temperatures, to actuate the circuit-breaker so as to interrupt the electric supply circuit, means adapted when steam is generated in said container to direct at least part of said steam against one of said heat-responsive elements, which is thermally insulated from the container and the heating element, and thereby to heat it to the corresponding predetermined temperature at which it actuates the circuit-breaker, and means adapted to conduct heat from the heating element to the other heat responsive element, the arrangement being such that, so long as the temperature of the heating element is restricted by the presence of liquid around it, the heat conducted to the said other heat-responsive element is insufficient to raise it to the corresponding predetermined temperature at which it actuates the circuit-breaker, but when the heating element is connected in the electric supply circuit and its temperature, due to the absence of water around it, is not so restricted, the heat conducted to said other heat-responsive element is sufficient to raise it rapidly to the corresponding predetermined temperature at which it actuates the circuit-breaker.

Figure 2:
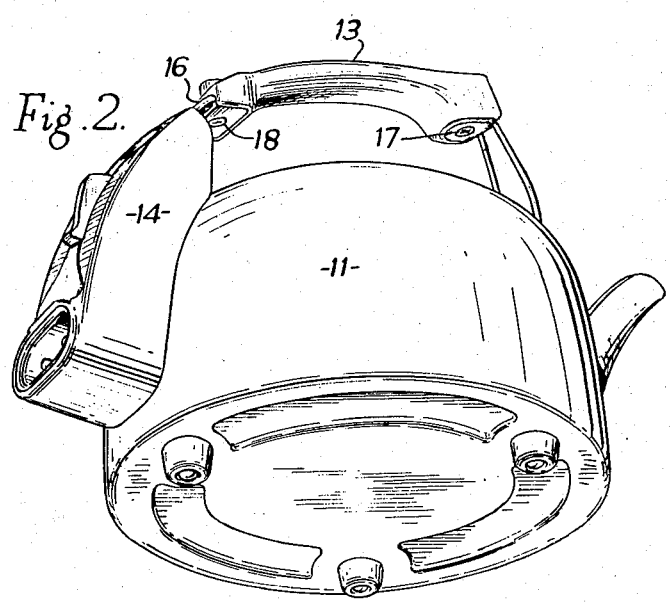
Figure 3:
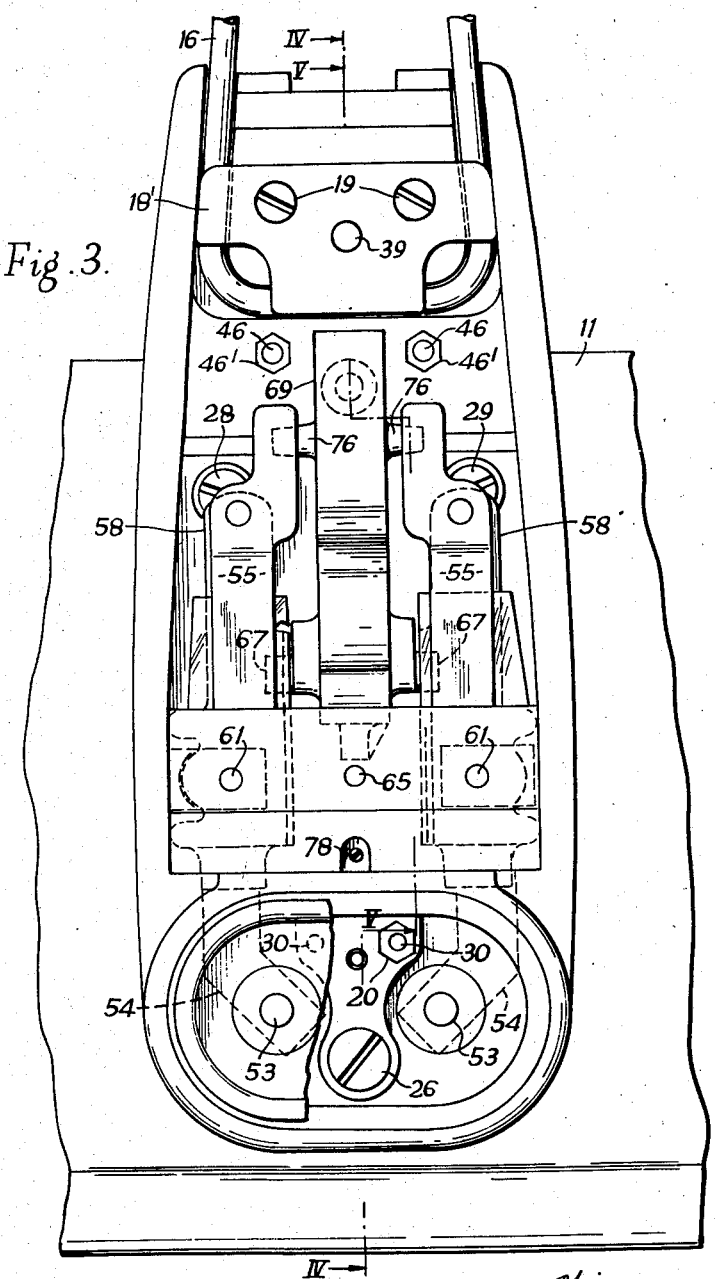
Figure 4:
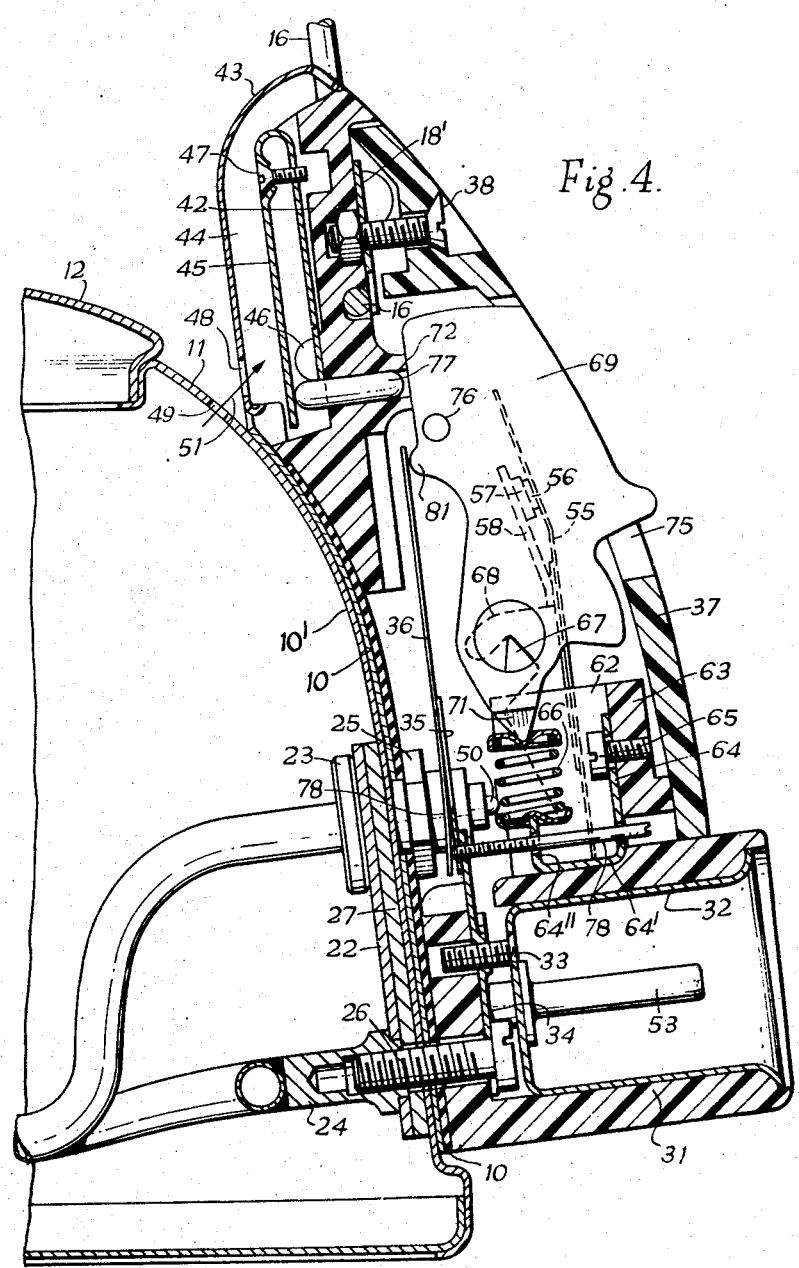
Figure 5:
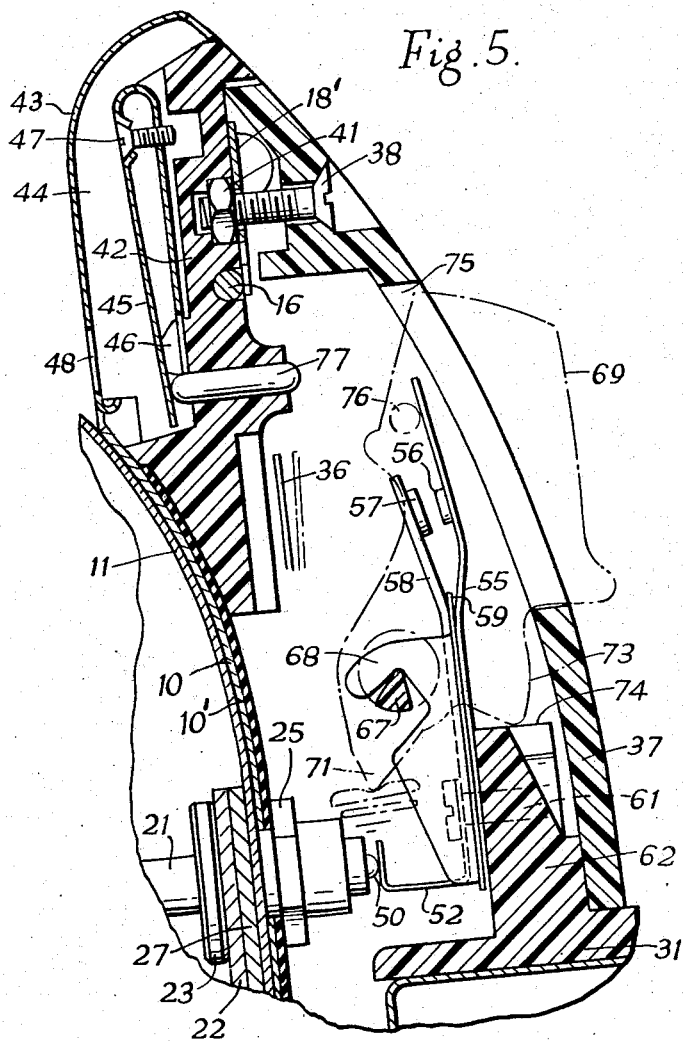

The invention will now be described by way of example with reference to the accompanying drawings, in which:

FIG. 1 is a perspective view showing the front and one side of an electric kettle, FIG. 2 is a perspective view showing the rear and other side of the kettle, FIG. 3 is a fragmentary rear elevation showing a switch housing with its rear cover plate removed, and FIGS. 4 and 5 are fragmentary sections on the lines IV—IV and V—V respectively in FIG. 3, with the rear cover plate in position.

The electric kettle (see FIGS. 1 and 2) comprises a metal container 11 for the liquid to be boiled, a lid 12 for the container, a handle 13 and a switch housing 14. The handle 13 which is composed of a material of low heat-conductivity is connected at its front end to the container 11 by the two limbs 15 of a return-bent metal rod and at its rear end to the housing 14 by a metal stirrup 16 (FIGS. 2 and 3).

The return bent part of the metal rod between the limbs 15 is secured to the bottom front surface of the handle 13 by a clamping screw 17 (FIG. 2) and the stirrup 16 is secured at its upper end to the bottom rear surface of the handle by a clamping screw 18, the lower end thereof being anchored within the upper part of the housing by a clamping plate 18' (FIG. 3) having two clamping screws 19.

The kettle is provided with an electric heating element 21 (FIGS. 4 and 5) which is mounted on a brass plate 22 carrying two brass bushes 23 (only one being shown) and a copper nut 24, the nut being brazed to a return loop of the element 21 and therefore rising rapidly in temperature if the element remains switched on while the container 11 is empty of water. The assembly consisting of the element 21, the brass plate 22, the bushes 23, and the nut 24 is secured inside the kettle by two nuts 25 (only one being shown) screwed on externally projecting screw-threaded ends of the bushes 23 and a copper screw 26 engaged in the nut 24. Clamped between the plate 22 and the wall of the container 11 is a gasket 27.

The housing 14, which is a moulding of electrically insulating material, is detachably secured to the container 11, with the interposition of a rubber gasket 10 and, if desired, a further gasket 10' of heat-insulating and water-absorbent material, by the copper screw 26 and two brass screws 28, 29 (FIG. 3). The lower part of the housing 14 is shaped to provide a socket 31 for a connector plug (not shown) on the end of a supply cable, which socket 31 is lined in known manner with a metal earth shroud 32. A screw 33 screwed into a boss forming part of a copper plate 34 retains the earth shroud 32 in position in the socket 31. The copper plate 34, which is held in position in the housing 14 by the head of the screw 26 and nuts such as 20 on studs 30 (FIG. 3) secured in the housing body, not only serves as an earthing connection, but also conducts heat from the screw 26 to a two-part bimetal strip 35, 36 mounted on its upper end.

The portion of the housing 14 above the socket 31 has an opening at the back which is normally closed by a cover plate 37 which is retained at its upper end by a screw 38, the shank of which extends through a hole 39 (FIG. 3) in the plate 18' and into the screw-threaded bore of a nut 41 held captive in a recess in a vertical partition wall 42 forming part of the housing 14.

A curved metal cover plate 43 encloses the front and top of an upper compartment 44 housing a return bent bimetallic strip 45 one limb of which is secured to the partition wall 42 by two screws 46 provided with nuts 46' (FIG. 3). The position of the other free limb of the bimetallic strip is adjustable by means of an adjusting screw 47. A slot 48 is formed in the cover plate 43 through which steam escaping from the container 11 through a vent 49 in the direction of the arrow 51 can enter the upper compartment 44 and impinge against the free limb of the bimetallic strip 45. The compartment 44 is vented at the top to allow the steam to escape.

Pins 53 (FIG. 3) for engagement in pin sockets in the connector plug already referred to are mounted in known manner in the socket 31. These pins are electrically connected by strip metal conductors 54 to flexible strip metal contact arms 55 carrying contacts 56 which are arranged to cooperate with contacts 57 on corresponding fixed strip metal contact arms 58. The lower end parts of the flexible contact arms 55 are separated by strips 59 of electrically insulating material from those of the corresponding fixed contact arms 58, and screws 61 extending through and electrically insulated from the lower ends of the respective pairs of cooperating arms serve for mounting them on parts 62 of the housing 14. The lower extremities of the fixed contact arms are fixed to metal contact strips 52 (FIG. 5) which make resilient connection with terminal contacts 50 on the ends respectively of the element 21.

A recessed part 63 of the housing between the two parts 62 has a bent metal part 64 secured to it by a screw 65 (FIG. 4). The bent metal part 64 has a forwardly bent part 64' which is supported on the top of the socket 31 and an upwardly bent part 64" which supports the lower end cap of a toggle spring 66. Pivotally mounted by means of knife edged projections 67 on each side which engage in notches in the under surfaces of parts 68 of the housing is a switch actuating member 69. This member 69 has a downwardly projecting arm 71 which engages in a central recess in the upper end cap of the toggle spring 66, so that the member 69 is capable of an over centre movement between a retracted position shown in FIG. 4 in which it engages an abutment surface 72 on a boss projecting rearwardly from the partition wall 42 and a projecting position shown in FIG. 5 in which a part 73 thereof engages an abutment surface 74 on the top of the housing part 62. The cover plate 37 is slotted at 75 to permit movement of the switch actuating member 69 into its projecting position. Lateral projections 76 on the member 69 cooperate with the flexible contact arms 55 to move the latter away from the fixed contact arms 58 when the member 69 moves across into the projecting position shown in FIG. 5.

A plunger 77 is mounted for axial sliding movement in a bore in the partition wall 42 between the free arm of the bimetallic strip and the upper part of the switch-actuating member 69, so that when the free arm of the bimetallic strip is deformed on being heated by steam from the vent 49, it displaces the plunger 77 axially to the rear and imparts a corresponding pivotal movement of the member 69 away from the abutment surface 72.

The setting of the two-part bimetallic strip 35, 36 is adjustable by means of an adjusting screw 78 the screw-threaded shank of which is engaged in a screw-threaded bore in the copper plate 34 and the front end of which projects through a hole in the bimetallic strip 35 and engages the lower end of the bimetallic strip part 36. The two parts 35, 36 are arranged to be deformed by heat in opposite directions respectively, the part 35 being deflected to the right as seen in FIG. 4 and the top and bottom of the part 36 to the left. By this means with relatively slow temperature rise the movement of the free end of strip part 36 is very small since the temperature rise of strip part 36 does not lag appreciably behind that of the strip part 35. In adjusting the arrangement by means of the screw 78, some stress is set up in the bent end of the part 36 which is tending to move the free end of this part to the right (FIG. 4). Temperature rise in the part 36 will therefore tend to move the free end of this part to the left by reason of the deflection of the top half and in the same direction by reason of the reduction in stress in the bottom half. Both these effects therefore add to oppose the rightwards deflection of the bimetal strip 35 producing a negligible net movement of the free end of the part 36.

When the kettle is to be used, the switch-actuating member is reset by hand, i.e. it is pressed in from the projecting position shown in FIG. 5 until it snaps over centre into the withdrawn position shown in FIG. 4 and the container 11 is filled with water. The contacts 56 are now engaged with the corresponding contacts 57 and, as soon as the connector plug is plugged into the socket 31, the element 21 will heat up. As soon as the water in the container boils, steam will be discharged through the vent 49 into the upper compartment 44 where it impinges on the free arm of the bimetallic strip 45. As this free arm heats up, it will be deflected from the position shown in FIG. 4 towards the position shown in FIG. 5, thereby displacing the plunger 77 axially against the switch-actuating arm 69. Consequently, the arm 69 will be tilted rearwardly until, after passing over centre, its toggle spring 66 causes it to snap into the position shown in FIG. 5. In the course of this movement the projections 76 will strike the flexible contact arms and effect a rapid separation of the contacts 56 from the contacts 57. By this means, both ends of the heating element 21 are disconnected from the corresponding connector pins 53, and the supply of current will remain disconnected until the switch-actuating member is reset by hand.

If the user should fail to fill the container 11 with water or if the kettle should "boil dry" for any other reason, heat will flow at an increased rate from the return loop of the over-heated element 21 via the nut 24, the screw 26, and the plate 34 to the two-part bimetallic strip 35, 36. Rightwards deflection of bimetallic strip 35 will occur producing a rightwards deflection of the free end of the part 36 since with rapid rates of temperature rise the temperature of strip 36 will lag appreciably behind that of strip 35, and the leftwards movement of the free end of part 36 will not occur to balance the rightwards movement of part 35. The free end of strip part 36 will therefore move against the projection 81 on the switch-actuating member 69 and displacement latter over centre. Thereupon the toggle spring will cause the member 69 to swing back smartly into the projecting position thereof shown in FIG. 5, so that the supply circuit is interrupted as described previously.

It will be appreciated that the two-part bimetallic strip 35, 36 is prevented from operating when the element 21 is immersed in water by the compensating action of the strip part 36.

The switch-actuating member, when in its projecting position as shown in FIGS. 2 and 5, gives a clearly visible indication that the contacts 56, 57 are open.

The element 21 and its mounting plate 22 on the one hand and the housing 14 and its contents on the other hand both form independent, easily removable and replaceable unit assemblies. To remove the housing 14, it is merely necessary to remove its cover plate 37, unscrew the three screws 26, 28, 29 and loosen the two screws 19, after which the housing can be swung upwardly and rearwardly around the lower part of the stirrup 16. As a result of this movement, the lower bent extremities 52 of the fixed contact arms 58 are electrically and mechanically disconnected from the terminal contacts 50 without the need for any unscrewing or unsoldering operations. The heating element 21 and its mounting plate 22 can now be easily removed and replaced, since they are secured in the container 11 only by the two nuts 25, the screw 26 having already been removed.

Furthermore, the settings of the temperature sensitive elements 45 and 35, 36 adjusted by means of the screws 47 and 78 respectively are not disturbed by the removal of the housing 14 from the container 11.

I claim:

1. An electric kettle comprising: a container for liquid to be heated; an electric heating element arranged in said container; a housing mounted externally on and thermally insulated from said container; an electric circuit in said housing for connecting said heating element to a source of electricity; a circuit breaker in said housing arranged to open and close said electric circuit, said circuit breaker including a movable actuator and a toggle spring device for urging said actuator between positions to open or close said circuit, said actuator adapted to be manually reset to close said circuit; a pair of heat-responsive elements mounted in said housing, one of said heat-responsive elements being operative to move said actuator to open said circuit upon the liquid reaching a boiling temperature, the other of said heat-responsive elements being operative to move said actuator to open said circuit when the amount of liquid in said container reaches a predetermined minimum; means for directing hot vapors in said container against said one heat-responsive element when the liquid begins to boil; and means for conducting heat from said heating element to said other heat-responsive element.

2. The combination recited in claim 1 wherein said housing includes a partition wall defining separate compartments, said one heat-responsive element being in the compartment on one side of said wall and said other heat-responsive element and said circuit breaker being in the compartment on the other side of the said wall, and including further an intermediate member displaceably mounted in said wall for operably connecting said one heat-responsive element with said actuator.

3. The combination recited in claim 2 wherein the intermediate member consists of an axially slidable plunger.

4. The combination recited in claim 1 in which said other heat-responsive element is provided with compensating means arranged so that, with comparatively slow rates of temperature change such as that obtaining when water is being heated, any tendency of the element to move in the actuating direction is compensated by an opposite and substantially equal movement in the opposite direction, whereas with rapid rates of temperature rise the compensating action is for all practical purposes inoperative.

5. The combination recited in claim 1 in which said other heat-responsive element comprises two bimetallic strip parts arranged to be deflected in opposite directions respectively by temperature change, one of said strip parts constituting the compensating means and being arranged so that heat from the heating element is conducted to it via the other strip part which is arranged to be deflected in the direction to actuate the circuit breaker.

6. The combination recited in claim 5, wherein the said other bimetal strip part has one of its ends rigidly mounted on a part in heat-conductive connection with the heating element and has its other end rigidly secured to an intermediate portion along the length of said one bimetal strip part; and, while one end of the said one bimetal strip part is arranged to actuate the circuit breaker, the other end thereof is engaged by the end of an adjusting screw the position of which determines the setting of the said one bimetal strip.

7. The combination recited in claim 1 in which said housing is removably secured on said housing, said heating element is in the form of a loop having its two ends extended through a wall of said container, each end having an electrical contact thereon, and said circuit includes resilient metal strips engaging said contacts and connected via said circuit breaker to current carrying pins of a plug and socket connector whereby upon removal of said housing said circuit will be removed automatically from said heating element.

References Cited in the file of this patent

UNITED STATES PATENTS

| 2,018,695 | Wilcox | Oct. 29, 1935 |
| 2,310,044 | Stevenson | Feb. 2, 1943 |
| 2,422,974 | Newell | June 24, 1947 |
| 2,528,191 | Turner | Oct. 31, 1950 |

FOREIGN PATENTS

| 755,971 | Great Britain | Aug. 29, 1956 |